United States Patent [19]

Rohlfing

[11] 3,717,620

[45] Feb. 20, 1973

[54] ARYLENE SULFIDE RESIN OXIDATIVE CURING PROCESS

[75] Inventor: Raymond G. Rohlfing, Bartlesville, Okla.

[73] Assignee: Phillips Petroleum Company, Bartlesville, Okla.

[22] Filed: July 20, 1971

[21] Appl. No.: 164,475

[52] U.S. Cl. ................... 260/79, 260/9 R, 260/37 R, 260/79.1
[51] Int. Cl. ............................................. C08g 23/00
[58] Field of Search ......................................... 260/79

[56] References Cited

UNITED STATES PATENTS 3,562,199  2/1971  Hill, Jr. et al ........................... 260/37
3,524,835  8/1970  Edmonds, Jr. et al ............... 260/79.1
3,354,129  11/1967  Edmonds, Jr. et al .................. 260/79

Primary Examiner—Donald E. Czaja
Assistant Examiner—Melvyn I. Marquis
Attorney—J. Arthur Young et al.

[57] ABSTRACT

A process for oxidatively pre-curing arylene sulfide resins stepwise by subjecting the particulate resin to oxidation at a temperature below the melting point of the resin for a period of time sufficient to reduce the melt flow of the resin and withdraw periodically at least a portion of the partially cured resin to obtain successive products having decreasing melt flow suitable for special applications requiring specific melt flow range.

7 Claims, No Drawings

ARYLENE SULFIDE RESIN OXIDATIVE CURING PROCESS

This invention relates to aromatic sulfide polymers having improved processing characteristics. In accordance with another aspect, this invention relates to a process for pre-curing poly(arylene sulfide) resins in a stepwise manner so as to obtain successive products from a single batch of resin having decreasing melt flow values. In accordance with another aspect, this invention relates to a process for decreasing the melt flow of arylene sulfide polymers by subjecting same to contact with an oxygen-containing gas at a temperature below the melting point of the polymer for a period of time sufficient to reduce the melt flow of the polymer. In accordance with a further aspect, this invention relates to a process for controlling the melt flow of polyphenylene sulfide polymers by stepwise procedure involving heating the polymer at a temperature below the melting point in the presence of an oxygen-containing gas, withdrawing a portion of the partially pre-cured polymer, followed by one or more subsequent pre-curing steps to further lower the melt flow with intermediate withdrawal of polymer of reduced melt flow.

Aromatic sulfide polymers ranging in consistency from viscous liquids to crystalline solids are known. While such polymers exhibit desirable properties for many applications such as molding compositions, the unmodified polymers normally possess a relatively high melt flow, e.g., above 4,000, which inhibits their use. For example, when exposed to process temperatures above their melt point the unmodified polymers tend to surface pre-cure only and require excessive processing times or special apparatus for thin film processing. Since the desirable properties make the polymers extremely useful, it would be advantageous to improve the processability of the solid polymers without materially affecting the desirable properties. Additionally, while polymers of this type exhibit desirably properties for many applications such as molding compositions, the unmodified polymers, e.g., obtained directly from the reactors, normally possess a high melt flow which limits their use in certain instances. Such polymers, i.e., the unmodified materials, possess a very low melt viscosity which makes it difficult to handle them by conventional molding practices.

The virgin poly(arylene sulfide) resin has a very high melt flow and it is known that it has to be pre-cured in order to make it possible to use it extensively. The extent of cure and the final melt flow which is attained depends upon the end use to which the polymer is to be put. For example, a fairly high melt flow can be used for fluid bed coating of metals while, for injection molding or compression molding, a much lower melt flow is desirable.

In accordance with the invention, it has been found that there is a time-temperature relationship required to convert virgin arylene sulfide polymers to a desired melt flow, and the present process provides for controlling the melt flow or melt viscosity of poly(arylene sulfide) resins in order to make their final application and end use properties conform to the desired values.

Accordingly, an object of this invention is to improve the processing characteristics of poly(arylene sulfide) resins.

Another object of this invention is to provide a process for producing poly(arylene sulfide) resins of varying melt flow values.

A further object of this invention is to provide a process for producing arylene sulfide polymers having varying melt flow properties which have specific fields of utility.

A further object of this invention is to provide a pre-curing process for poly(phenylene sulfide) resins whereby products of varying melt flow values are obtained.

Other objects and aspects, as well as the several advantages of the invention, will be apparent to those skilled in the art upon reading the specification and the appended claims.

In accordance with the invention, a process is provided for controlling the melt flow of poly(arylene sulfide) resins in which the polymer is subjected to a stepwise pre-curing process regulated as to time and temperature to provide successive products from a single batch having decreasing melt flow and suitable for special applications requiring a specific melt flow range for each special application.

In accordance with another embodiment of the invention, a process is provided for the pre-curing of arylene sulfide resins to a plurality of products having different melt flow values comprising subjecting a particulate arylene sulfide resin to oxidative curing at a temperature below the melting point of the resin in plural stages with partial product withdrawal between each oxidative curing stage.

In accordance with a further embodiment of the invention, the melt flow of poly(phenylene sulfide) resins is decreased stepwise by heating a batch of the polymer in the presence of an oxygen-containing gas such as air at a temperature below the melting point of the polymer for a period of time sufficient to substantially reduce the melt flow of the polymer followed by withdrawal of at least a portion of the polymer reduced in melt flow and continuing the heating of the remaining polymer followed by additional withdrawals and heatings until the desired final melt flow value is reached.

The term "arylene sulfide polymer" as used in this specification is intended to include polymers of the type which are prepared as described in U. S. Pat. No. 3,354,129, issued Nov. 21, 1967, to Edmonds and Hill. As disclosed in this patent, these polymers can be prepared by reacting a polyhalo-substituted cyclic compound containing unsaturation between adjacent ring atoms and an alkali metal sulfide in a polar organic compound. The resulting polymer contains the cyclic structure of the polyhalo-substituted compound coupled in repeating units through a sulfur atom. The polymers which are preferred for use in this invention, because of their high thermal stability and availability of the materials from which they are prepared, are those polymers having the repeating unit —R-S— where R is phenylene biphenylene, naphthylene, biphenylene ether or a lower alkyl-substituted derivative thereof. By "lower alkyl" is meant alkyl groups having one to six carbon atoms such as methyl, propyl, isobutyl, n-hexyl, and the like. The preparation of such polymers is quite well disclosed in the above patent of Edmonds et al.

The polymers of this invention are preferably those which have melting temperatures above about 200° C. These arylene sulfide polymers can have a melting temperature anywhere in the range from about 200° C. to about 500° C. Polymers of phenylene sulfide normally have melting temperatures in the range from about 290° to about 480° C. The preferred polymers have an inherent viscosity in chloronaphthalene at 206° C. of at least 0.1, more preferably between 0.1 and 0.3, and ideally between 0.13 and 0.23.

The invention is broadly applicable to polyarylene sulfides formed by any technique. It can be used, for example, with the resins manufactured as described in U. S. Pat. No. 2,513,188 prepared by reacting mixtures of p-dichlorobenzene and 1,2,4-trichlorobenzene with sulfur and a metal halide at fusion temperatures. It can also be used with resins manufactured by the method described in British Pat. No. 962,941 wherein metal salts of halothiophenols are heated at a polymerizing temperature. The invention is especially useful with polymers produced by reacting anhydrous sodium sulfides with polyhalo-substituted cyclic compounds in polar organic solvents as disclosed in U. S. Pat. No. 3,354,129. The invention can be used with linear polymers formed by use of dihalo aromatic compounds or with crosslinked polymers wherein polyhalo aromatic compounds are added to the polymer to aid crosslinking.

As indicated above, it has now been found according to the invention that an improved class of poly(arylene sulfide) resins can be obtained by heating sulfur-containing polymers such as disclosed and claimed in Edmonds et al, U. S. Pat. No. 3,354,129, at a temperature below the melting point of the resin for a time sufficient to effect a reduction in the melt flow of the resin, withdrawing at least a portion of the resin reduced in melt flow and continuing the heating of the remaining resin in plural stages until the desired melt flow value is reached, thereby producing a plurality of products of varying melt flow values. The so-modified polymer is a stable resinuous material which retains its original physical appearance, e.g., particulate shape, and remains sufficiently thermoplastic to form into shaped objects as by injection or compression molding with substantially reduced processing times.

It is to be understood that the properties of the polymeric material modified according to the invention can vary appreciably depending upon the nature of the starting material such as the molecular weight and melt viscosity and the like. The length of time and temperature of the heat treatment can also be used to vary the properties within wide limits, it being understood that even under the mildest treatments some improvement in heat stability and processing capability is obtained.

In accordance with the invention, the polymer is heated to a temperature which is below the melting point of the chosen polymeric product for a period of time sufficient to effect cure and reduce the melt flow. The melt point of arylene sulfide polymers can be readily determined by differential thermal analysis (DTA) by heating a 10 mg sample of the polymer at a rate of 10° C. per minute. The melt point is taken from the DTA thermogram in a conventional manner. The temperature will vary within the range of about 200° F. to about 1,000° F. depending upon the molecular weight and nature of the polymeric product being treated. Generally, the treatment temperature will be in the range of from about 25° to about 125° F., preferably from about 50° to about 100° F., below the melt point of the polymer being treated. The time during which the mixture is held at such a temperature will be sufficient to effect pre-cure and reduce the melt flow, and ordinarily will range from a few minutes to 15 hours or to a total of about 3 days, usually from about two to twelve hours with the longer times being used at lower temperatures and vice versa, depending specifically on the type of polymer being processed. The preferred time for a polyphenylene sulfide resin, for example, is two to eight hours at a temperature ranging from about 50° to about 100° F. below the melt point of the polymer.

As indicated above, the heating is carried out in the presence of an oxygen-containing gaseous oxidizing atmosphere such as air. The oxidizing gas rate with respect to contacting of the particulate resin will vary appreciably, depending upon the type of apparatus employed for carrying out the oxidative curing. If desired, air can be heated prior to contacting with the particulate resin.

The heating according to the invention can be carried out in conventional equipment. A convenient method for carrying out the process is to contact the particulate resin in a purged bed of resin utilizing air as the oxidizing and purging medium. Periodic product withdrawal of decreasing melt flow values can be conveniently carried out with purged bed operating equipment.

As an illustration of the versatility of the instant process, poly(phenylene sulfide) resin in an uncured state obtained as production polymer in particulate form was subjected to air oxidation in a purged bed contacting apparatus to produce products having varying melt flow properties as follows:

| PPS Grade Designation | MF* (gms/10 mins.) | Primary Polymer Application |
|---|---|---|
| P-1 | 1200±200 | lightly pre-cured PPS for spray and fluidized bed coatings |
| P-2 | 500±100 | moderately pre-cured PPS for fluidized bed coatings |
| P-3 | 175±50 | more heavily pre-cured PPS for dry powder spray coatings |
| P-4 | 50±25 | tightly cross-linked PPS for injection molding with or without filler (asbestos or glass) |
| P-5 | 1700±300 | very lightly pre-cured PPS for spray and fluidized bed coatings |

*For melt flow determination, see procedure following Table I.

The polymers of this invention have utility in any use wherein high melting point and/or a high temperature stability is desired. These polymers can be blended with fillers, pigments, stabilizers, accelerators, softeners, extenders, and other polymers. Such fillers as graphite, carbon black, titania glass fibers, metal powders, magnesia, asbestos, clays, wood flour, cotton floc, alpha-cellulose, mica, and the like can be employed.

The following examples are intended to illustrate the compositions and process of the invention.

EXAMPLE I

Various batches of polyphenylene sulfide prepared in accordance with the procedure of U. S. 3,354,129 were subjected to a pre-curing treatment in a forced hot air circulating oven and samples were withdrawn at the intervals indicated and tested for melt flow by ASTM D 1238 *(*For melt flow determination, see procedure following Table I.)

and analyzed for melt flow to follow the cure rate. When the desired melt flow value was achieved air purge was stopped, and the pre-cured polymer was discharged from the bottom of the vessel to a container.

TABLE I

| Run No. | Original MF[2] | Stirring rate, r.p.m. | Air flow rate, c.f.m. | Pre-curing temperature, °F. | First sample | | | Second sample | | | Third sample | | | Fourth sample | | | Fifth sample | | |
|---|---|---|---|---|---|---|---|---|---|---|---|---|---|---|---|---|---|---|---|
| | | | | | Hrs. | MF | Gr.[1] | Hrs. | MF | Gr. | Hrs. | MF | Gr. | Hrs. | MF | Gr. | Hrs. | MF | Gr. |
| 1 | >4,000 | 62 | .325 | 535 | 2½ | 1,020 | P1 | 3½ | 386 | P2 | | | | | | | | | |
| 2 | >4,000 | 62 | .23 | 500 | 2 | 2,070 | P5 | 3 | 1,050 | P1 | 4 | 211 | P3 | | | | | | |
| 3 | >4,000 | 62 | .325 | 530 | 2 | 1,680 | P5 | 3 | 600 | P2 | 4 | 171 | P3 | 4½ | 112 | | | | |
| 4 | >4,000 | 62 | .325 | 530 | 2 | 940 | P1 | 3 | 271 | ____ | 4 | 90 | P4 | 4½ | 52 | P4 | | | |
| 5 | >4,000 | 62 | .325 | 530 | 2 | 3,030 | ____ | 3 | 1,680 | P5 | 4 | 1,133 | P1 | 5 | 800 | ____ | 6 | 53 | P4 |
| 6 | ____ | 80 | .325 | 510 | 3 | 880 | ____ | 4 | 168 | P3 | 5 | 45 | P4 | 6 | 17 | | | | |

[1] For grade, please see explanation in column ____ of this patent.
[2] Normally the virgin polymer melt flow is approximated to be in the range of 4,000–6,000.

NOTE.—Melt flow values of the pre-cured polymer were determined by utilizing a modified version of an ASTM Method D-1238 melt indexer. Although orifice diameter was identical at 0.0825 inch, temperature was maintained at 650° F. by installation of larger heaters, and weight applied to the molten polymer was 5 kg. A spring-loaded plunger with a plug to fit the orifice I.D. was used to keep the polymer in the analyzer barrel during the standard 5-minute heat-up period. When the heat-up period had elapsed the plunger was removed rapidly and polymer flow rate (in terms of grams of PPS extruded per 10 minutes at 650° F. under a weight of 5 kg.) was determined. A Mettler 1200 N precision type balance was used to weigh the polymer extrudate. Reproducibility of melt flow values from a blended polymer sample was quite good with maximum deviation from the arithmetic mean value less than ±10 percent.

The table above illustrates the change in melt flow of poly(phenylene sulfide) when treated according to the prescribed procedure to produce samples of varying suitability for different applications.

EXAMPLE II

A sample of poly(phenylene sulfide) (MF 3000) was pre-cured as in Example I at a temperature of 525° F. and air flow rate 0.23 SCFM but in this case an accelerator, 0.5 weight percent benzene disulfonylazide, was added to the sample.

After 2 hours — MF still too high to measure
After 3 hours — 678
After 4 hours — 172
After 5 hours — 22

A slightly faster cure rate was obtained.

EXAMPLE III

A 50-pound weight sample of poly(phenylene sulfide) was pre-cured at 510° F., and 0.23 CFM air flow rate. Successive 5-pound samples for coating studies were withdrawn after 165 minutes, MF 2080; after 180 minutes MF 1740 (P5 grade); after 205 minutes, MF 1442; the remainder was pre-cured to a MF of 200 after 6¼ hours.

In carrying out the evaluations for Examples III and IV, a 30-gallon vessel provided with a double spiral type agitator and the associated 36 KW hot oil system were used together with suitable control valves and other equipment to regulate temperature and air flow. Polymer was charged to the precuring vessel in 50-pound batches with vessel temperature at 400° F. or above. Bed temperature normally dropped to 150°–200° F. when the charge was made, and then rose to about 510° F. pre-curing temperature in 2–3 hours. Preheated air was introduced to the bottom of the vessel when the bed temperature reached 480° F. and was held at this rate for the duration of the pre-curing period. The double spiral agitator lifted polymer along the wall of the vessel and forced it down along the agitator shaft resulting in a gentle rolling action of the polymer bed. Samples were withdrawn from the bed

EXAMPLE IV

Another batch of poly(phenylene sulfide) was similarly pre-cured as in Example III. One five-pound sample was withdrawn after 4½ hours at MF 1080; another five-pound sample was withdrawn after five hours at MF 723. The remainder was pre-cured to a MF 10 after 12 hours.

Examples III and IV illustrate the planned withdrawal of samples for particular grades of pre-cured polymer.

I claim:

1. A step-wise process regulated as to time and temperature to provide successive products from single batches of arylene sulfide resins having decreasing melt flow values suitable for special applications requiring a specific melt flow range for each application which comprises the steps of:

a. subjecting uncured particulate arylene sulfide resin to oxidative pre-curing by contacting the particulate resin with an oxygen-containing gas at a temperature ranging from about 25° to about 125° F. below the melting point of said resin for a period of time sufficient to substantially reduce the melt flow of the resin, b. withdrawing a portion of said resin of reduced melt flow as product having desired melt flow properties, c. subjecting said resin remaining in step (b) after said withdrawal to further oxidative pre-curing by contacting with an oxygen-containing gas at said temperature below the melting point of said resin for an additional period of time sufficient to further reduce the melt flow of said resin, d. withdrawing another portion of said resin of further reduced melt flow as product having desired melt flow properties, and e. continuing the previous steps of oxidative pre-curing and intermediate withdrawal of partially oxidatively pre-cured resin until the desired final melt flow value is reached.

2. A process for the pre-curing of arylene sulfide resins to a plurality of products having different melt flow values wherein each product has value for a different utility which comprises:

a. subjecting a particulate arylene sulfide resin to oxidative precuring in plural stages by contacting with an oxygen-containing gas at a temperature ranging from about 25° to about 125° F. below the melting point of the resin for a period of time sufficient to substantially reduce the melt flow of the resin during each heating stage, and b. withdrawing as product after each heating stage at least a portion of the resin of reduced melt flow produced during each heating stage prior to subjecting the remainder of the resin of reduced melt flow to additional oxidative pre-curing and heating to provide another portion of resin further reduced in melt flow.

3. A process according to claim 2 wherein the temperature during each heating stage is within the range of about 50° to 100° F. below the melting point of the resin being pre-cured, the time is in the range 2–8 hours, and the oxygen-containing gas is air.

4. A process according to claim 2 wherein the particulate arylene sulfide resin being cured is purged in a zone with air as the oxidizing and purging medium and wherein there is periodic removal of partially oxidized cured resin from the purged bed of particulate resin.

5. A process according to claim 2 wherein the process is carried out by a batchwise curing of the entire batch of particulate arylene sulfide resin with periodic removal of product between heating stages until the desired final melt flow for the final portion of resin is obtained or reached.

6. A process according to claim 2 wherein the arylene sulfide resin is polyphenylene sulfide, the oxygen-containing gas is air, and there are approximately five different products of different melt flow values recovered during the oxidative pre-curing process and further wherein the melt flow as determined by differential thermal analysis (DTA) by heating a 10 mg sample of the polymer at a rate of 10° C. per minute for each successive product withdrawn is as follows:

1st product — melt flow is $1,200 \pm 200$
2nd product — melt flow is $500 \pm 100$
3rd product — melt flow is $175 \pm 50$
4th product — melt flow is $50 \pm 25$
5th product — melt flow is $1,700 \pm 300$ 7. A process according to claim 2 wherein the particulate resin is contacted in a purged bed of resin with air as the oxidizing and purging medium.

* * * * *